(12) United States Patent
Pazel

(10) Patent No.: US 6,441,835 B1
(45) Date of Patent: Aug. 27, 2002

(54) RESOLUTION POLICY FOR DIRECT MANIPULATION ON HIERARCHICALLY STRUCTURED VISUALS

(75) Inventor: Donald P. Pazel, Montrose, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/440,654

(22) Filed: Nov. 16, 1999

(51) Int. Cl.[7] .................................................. G06F 3/00
(52) U.S. Cl. ........................ 345/769; 345/853; 709/332
(58) Field of Search .............................. 345/769, 853, 345/804, 770, 781, 792, 767, 856, 764, 859, 860, 861; 709/331, 332, 315, 316

(56) References Cited

U.S. PATENT DOCUMENTS

| | | | | |
|---|---|---|---|---|
| 5,754,178 A | * | 5/1998 | Johnston, Jr. et al. | ....... 345/769 |
| 5,764,873 A | * | 6/1998 | Magi et al. | ............... 345/769 |
| 5,956,030 A | * | 9/1999 | Conrad et al. | .............. 345/769 |
| 6,208,344 B1 | * | 3/2001 | Holzman et al. | ....... 345/853 X |
| 6,219,049 B1 | * | 4/2001 | Zuffante et al. | ............ 345/764 |
| 6,275,228 B1 | * | 8/2001 | Cataudella | .................. 345/764 |

* cited by examiner

Primary Examiner—Raymond J. Bayerl
(74) Attorney, Agent, or Firm—Whitham, Curtis & Christofferson, P.C.; Stephen C. Kaufman

(57) ABSTRACT

A method and apparatus for applying a resolution policy for direct manipulation of nested graphical elements. This policy resolves the allowance or disallowance of dragging and dropping of a guest graphical element onto a host graphical element. This is particularly useful when applied to hierarchically structured visual, wherein nested graphical elements may delegate direct manipulation to parent graphical elements. A number of allowed manipulations are defined for the guest and host visual objects. A guest visual object may not have a defined manipulation with a host visual object, but its immediate parent might. The present invention resolves policies for defining allowed manipulations for guest and host visual objects that do not have direct definitions for manipulations and must rely on definitions attributed to their parent.

8 Claims, 9 Drawing Sheets

RESOLUTION POLICY FOR DIRECT MANIPULATION ON HIERARCHICALLY STRUCTURED VISUALS

CROSS REFERENCE TO RELATED APPLICATION

This application is related to U.S. patent applications Ser. No. 09/409,277, entitled "Utilizing Programming Object Visual Representations For State Reflection," filed on Sep. 30, 1999, by D. Pazel; U.S. Ser. No. 09/431,153 entitled "Utilizing Programming Object Visual Representations for Code Generation", filed on Nov. 1, 1999, by D. Pazel; and concurrently filed U.S. patent application Ser. No. 09/440,653 entitled "Means For Specifying Direct Manipulation Relationships on Hierarchically Structured Visuals", by D. Pazel, all assigned to a common assignee, the entire subject matter of which is incorporated herein by reference.

BACKGROUND OF THE INVENTION

1. Field of the Invention

The present invention generally relates to direct manipulation of graphical objects on a visual display for a computing system. It focuses specifically on graphical objects that are hierarchically composed of other graphical objects, any one of which may have direct manipulation properties relative to other graphical objects. It specifies a definition for direct manipulation between two or more distinct objects of this type, focusing specifically on the defined direct manipulations between the graphical objects composing them. A process for detecting which manipulations take precedence in practice is specified. The end process simplifies direct manipulation in these circumstances as well as makes these interactions more intuitive.

2. Background Description

Direct manipulation, also referred to as drag-drop, in window-based systems has existed for many years. Direct manipulation concerns the relationship between any two graphical elements on a display screen and how they interact when one is dragged over and possibly dropped onto the other. This relationship is programmed into an application or system relating to the graphical elements. It is this programming which both allows or disallows the dragging over, as well as implements a semantic meaning to the drop operation.

The specification of direct manipulation relationships, being programmed in detail per application, is tedious, difficult, and prone to errors. It requires the specification of a number of programming elements, such as specialized data structures and display images, and its programming is usually fragmented into several phases such as initialize drag, dragging-over, and drag-drop. All of this makes the specification of direct manipulation difficult and non-intuitive.

The direct manipulation of graphical objects is especially useful in the area of visual programming languages. The motivation behind visual programming language technology is to utilize visual representations of programming elements to build and generate programs. The field is very large. Generally however, the approaches to visual programming may be classified into the following:

Visual Designers—These are visual programming languages, which focus on the construction of user interface applications. Much of the focus is on interface form and presentation construction with caveats for generating event code to facilitate textual programming of other parts of an application.

Wiring-Based Languages—These languages have visual representations of programming entities, such as objects or processes. Programming proceeds by creating and connecting visual representations with lines, which typically indicate data or event flow.

Structured-Logic Based—These focus on structuring the logic of a program. Typically logic is represented with nested graphical figures which represent logical entities, e.g. if, loops, etc. Typically visual representations of programming objects are not shown in these tools.

Form-Based—These are visual programming languages of the spreadsheet genre. Typically represented as grids or arrays of numbers, a textual macro language typically accompanies the language to do more complex manipulations.

Most visual programming languages are wiring-based. The power of this type of language resides in its ability to represent parallelism. That is, its power is its ability to show either simultaneous, concurrent, or alternate possible executions at the same time. The focus of these types of languages has been a connection paradigm (wires) which generally indicates either event or data flow.

Whereas the connectivity aspect is the chief asset of these languages, it is also its greatest liability. Wirebased language programs become difficult to decipher even in modestly complex examples, as the causal nature of execution rapidly gets lost in the implicit parallelism of the diagram. Also, the visual element that represents the object tends to be limited. Generally, they are either named boxes representing variables, or in iconic representations. In this case, the true dynamic of the language is in connecting these representations, not working with them. At heart, these are execution-based languages to which the data model is secondary. Much more could be gained from clearer and more expansive object detail as interaction amongst visual details could lead to larger interpretations of corresponding interprogramming object possibilities. As a simple example, cross object property assignment could be done with a simple drag-drop operation on graphical elements representing the source and target properties of the corresponding programming objects.

While direct manipulation has been very successful as a visual paradigm, one can run into problematic situations. One situation in particular is when graphical elements are nested within other graphical elements, and one wants to do drag-drop with inner nested elements. The nesting aspect of graphical elements intuitively indicates that inner elements are "part of" outer elements. However, defined behavior of direct manipulation amongst graphical elements is independent of that, for instance, when dragging and dropping is allowed between graphical elements independently of the nesting of graphical elements. In many cases, it would be expedient and practical for an application to have a graphical element delegate the dragging and dropping capabilities to its parent. For example, in dragging an inner element over an element that allows the inner's parent to be dropped but not the inner itself. In that situation, it would be intuitive to interpret this as a dragging of that parent and allow the drop. The containment is intuitively sufficient to justify this action. A statement of when similar actions should occur is a formulation of a resolution policy on direct manipulation that is the subject of this invention.

SUMMARY OF THE INVENTION

It is therefore an objective of the present invention to provide a method and apparatus for applying a resolution policy for direct manipulation. This policy would resolve the allowance or disallowance of dragging and dropping of a graphical element onto another. This is particularly useful when applied to hierarchically structured visuals, wherein nested graphical elements may delegate direct manipulation to parent graphical elements.

According to the invention, a guest visual object is to be manipulated with respect to a host visual object. Typically, the guest object is dragged over and/or dropped onto the host visual object. The guest and host visual objects may be nested within other visual objects. If a first visual object is immediately nested inside of a second visual object, then the first visual object is called the child object and the second visual object is called the parent object.

A number of allowed manipulations are defined for the guest and host visual objects. A guest visual object may not have a defined manipulation with a host visual object, but the guest's immediate parent might. The present invention resolves policies for defining allowed manipulations for guest and host visual objects that do not have direct definitions for manipulations and must rely on definitions attributed to their parent.

The resolution policy of the preferred embodiment of the invention first determines whether any object in the chain of parents and children for the guest visual object have defined manipulations with the host visual object before looking to the parent of the host visual object for a definition. This policy could also be defined to traverse the host visual object first, for each guest visual object. Similarly, it is not necessary to traverse the chain from bottom up, i.e., the oldest parent could be checked first before the most immediate parent.

Once the desired manipulation has been resolved as allowed or disallowed, the graphical display is updated in a desired manner to indicate the results of the resolution. For instance, if a dragging-over or dropping is not allowed, the cursor could be modified, or the screen could blink in alternating patterns of light and dark, or positive and reverse images. When a visual object is dragged a special drag image could be displayed. Similarly, when a visual object is dropped the graphical displayed is updated to reflect its new location.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
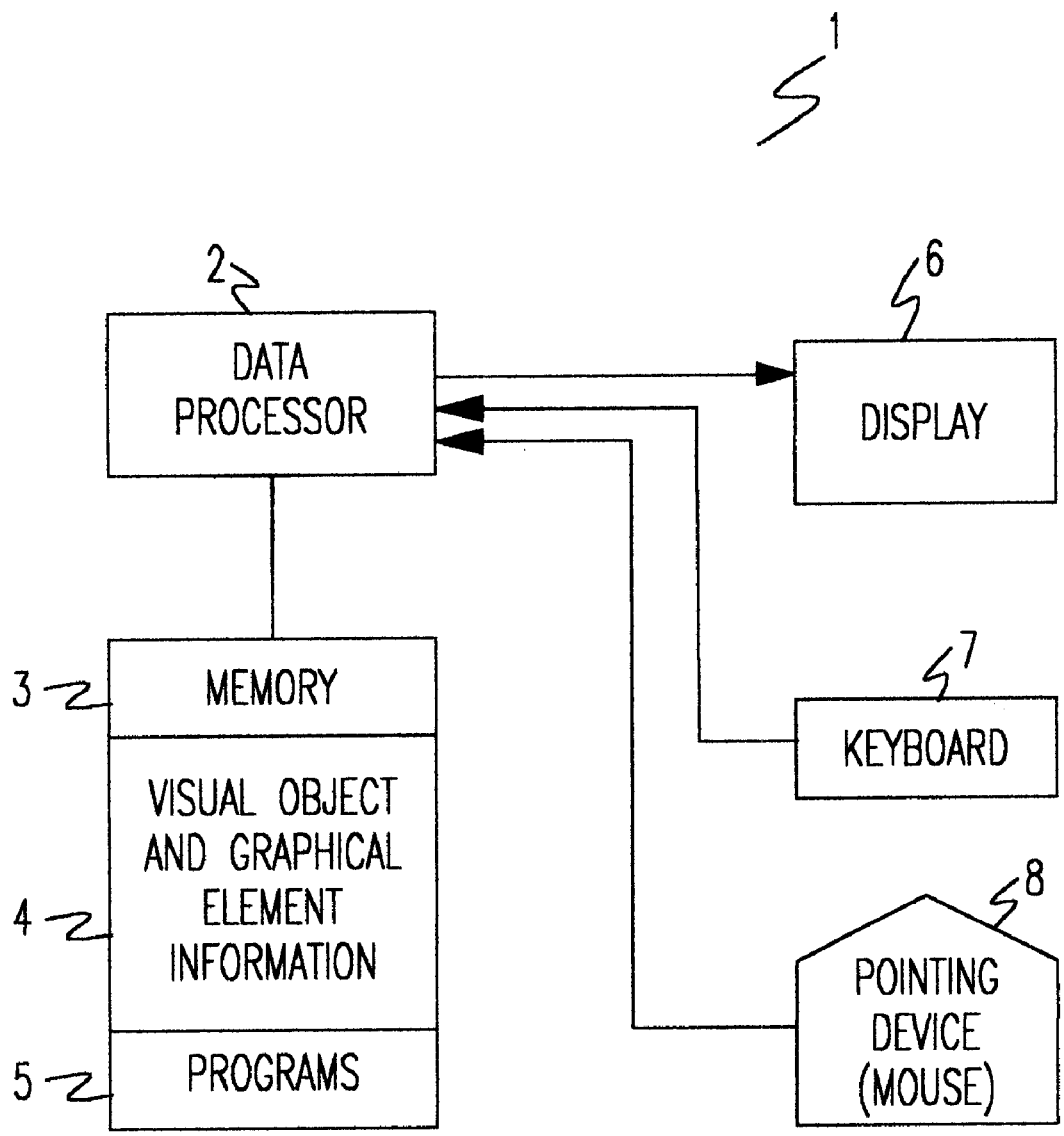
FIG. 1 depicts a block diagram of a data processing system pertaining to this invention.

The present invention relates to a method and apparatus for applying direct manipulation, also known as drag-drop, to a specific but typical visual graphical object called a hierarchically structured visual, or visual object for short. In the present invention, a visual object is a distinct graphical entity displayed on a computer display.

The preferred embodiment of the invention is used with a visual programming language that provides a programmer the ability to generate code by manipulating graphical objects on a display device and is best practiced with a visual programming language incorporating the methods of related patent applications entitled "Utilizing Programming Object Visual Representations for State Reflection", U.S. patent application Ser. No. 09/409,277, supra, describing the utilization of graphical elements for representing objects used in programming, "Utilizing Programming Object Visual Representations for Code Generation", U.S. patent application Ser. No. 09/431,153, supra, describing a method for utilizing a programming object's graphical elements to generate computer programs, and "Means For Specifying Direct Manipulation Relationships on Hierarchically Structured Visuals", U.S. patent application Ser. No. 09/440,653, supra, describing a method for defining direct manipulation relationships between graphical objects, and a means for using that information in applications.

In the preferred embodiment, a number of different types of programming objects may be graphically represented including but not limited to local and global variables. These include variables of common types such as, but are not limited to, integer, real, string, character, and Boolean, as well as untyped objects. They also include objects that are derivatives or composites of these and other variables, such as is taught in object-oriented technology, i.e. programming objects based on the classic object-oriented methodology.

In order to generate executable code by manipulating graphical objects, one must define an action to be taken when objects are manipulated in a desired manner. As illustration, suppose a name field on a new object is represented by a graphical object N. A string is represented as graphical object S. A desired action could be that when one drags the graphical object S over graphical object N that the resulting action is to generate code that assigns the string s to the name object. The present invention allows a programmer to detect which object manipulations take precedence and resolve conflicts when newly defined actions for newly defined objects are based on those defined objects and actions. One can then generate code based on the actions resulting from the predetermined drag-drop manipulations. This method utilizes hierarchically structured objects to be discussed in more detail below.

A visual object is comprised of a set of nested graphical elements, which are structured hierarchically composing the visual object. However for clarification, in general, in the preferred embodiment of the present invention, graphical elements include visual artifacts such as, but not limited to, squares, ellipses, text, and irregular shapes. Properties of these elements include, but are not limited to, size, color, border line type, and border color.

Other geometric shapes such as trapezoids, triangles, and the like are contemplated for use as graphical elements by the present invention. In addition, non-traditional, graphical elements which rely on techniques of 3-dimensional figures, animations, and the like, are also contemplated. Accordingly, the method and apparatus of the present invention is not limited to any one type of graphical element.

Referring now to the drawings, and more particularly to FIG. 1, there is shown a block diagram of a data processing system for the present invention, as described above. In the preferred embodiment, the data processing system 1 is a personal computer (PC) such as an IBM APTIVA computer (IBM and Aptiva are both registered trademarks of the International Business Machines Corporation). However, other data processing systems 1 are also contemplated for use by the present invention.

Referring again to FIG. 1, the data processing system 1 of the present invention comprises a data processor 2 having a memory 3. The memory 3 is coupled to the data processor 2 via a bidirectional bus. In the preferred embodiment, the memory 3 includes program and data memory. The memory also includes information about the visual objects and their graphical elements 4, and programs for manipulating the graphical elements 5.

The graphical information 4 (e.g. visual, objects composed as graphical elements) is displayed on the display 6, which is coupled to the data processor 2. In the preferred embodiment, a user data entry device 7, (e.g. keyboard or other interactive device) and a pointing device 8, for example, a mouse or a trackball, are also coupled to the data processor 2.

In the preferred embodiment, the display 6 provides a presentation space in order to display the visual objects of the present invention. In alternative embodiments, either the pointing device 8 or predefined keys of the data entry device 7 may be used to manipulate the data in conformity with the present invention.

Figure 2:
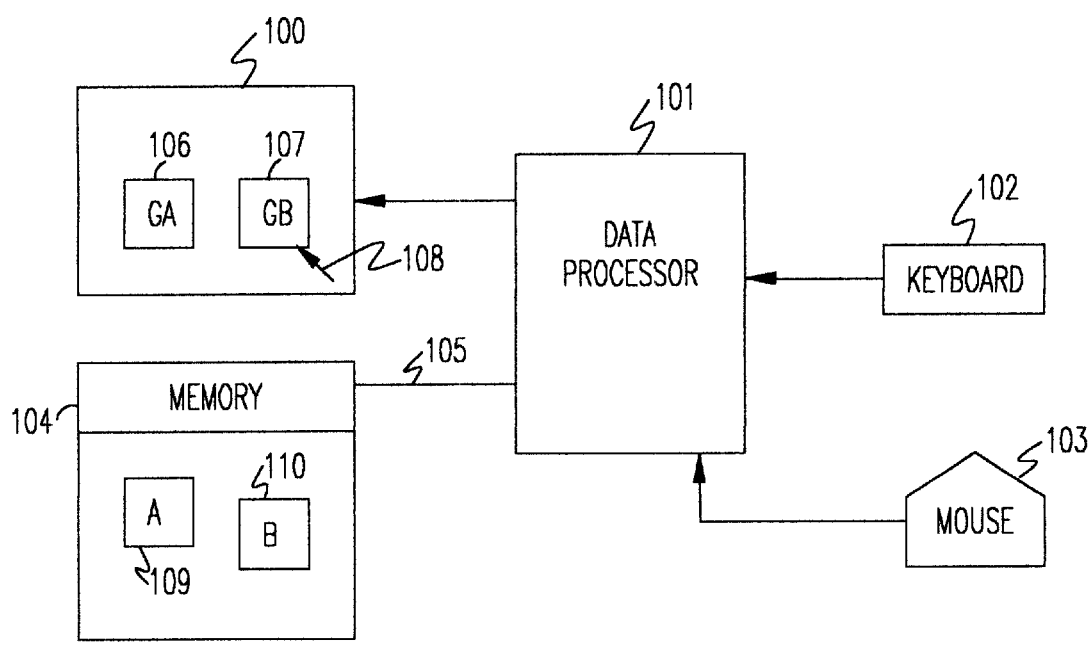
FIG. 2 depicts the elements for direct manipulation in a computing system.

Referring now to FIG. 2, there is shown a reference diagram illustrating the idea or concept of direct manipulation as background relating to the present invention. A display device 100 is attached to a data processor 101 that is also attached to a keyboard 102 and mouse 103. The data processor 101 is also attached to memory 104 by a high-speed bus 105. Shown on the display 100 are two graphical objects GA 106, and GB 107. There is also a pointer or mouse indicator 108, which corresponds and reacts in position to the mouse 103. In memory, the information about the visual state of GA and GB, such as but not limited to size, position, and visual composition, is encapsulated within corresponding memory objects A 109, and B 110.

Figure 3:
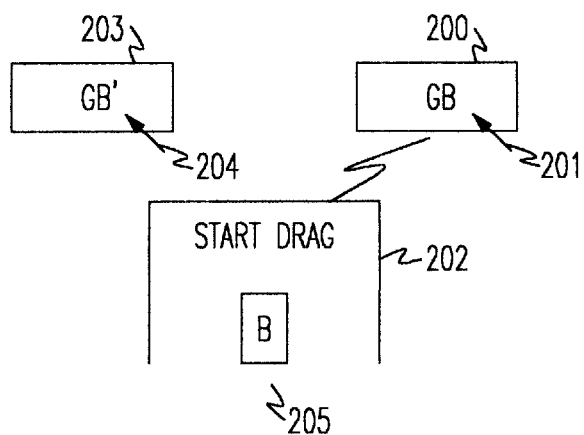
FIG. 3 depicts the initialization of direct manipulation.
Figure 4:
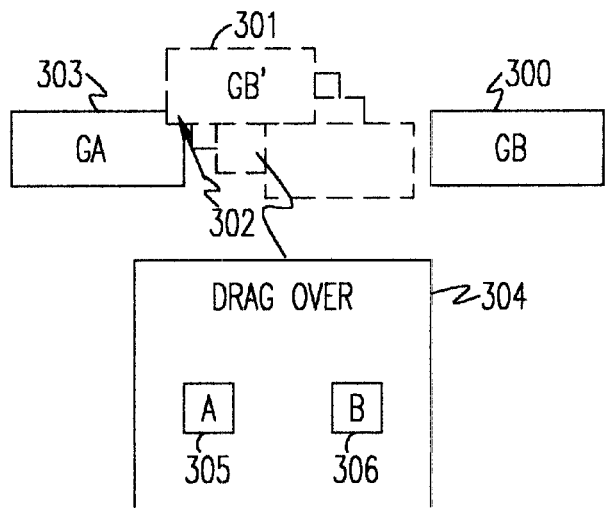
FIG. 4 depicts the dragging process of direct manipulation.
Figure 5:
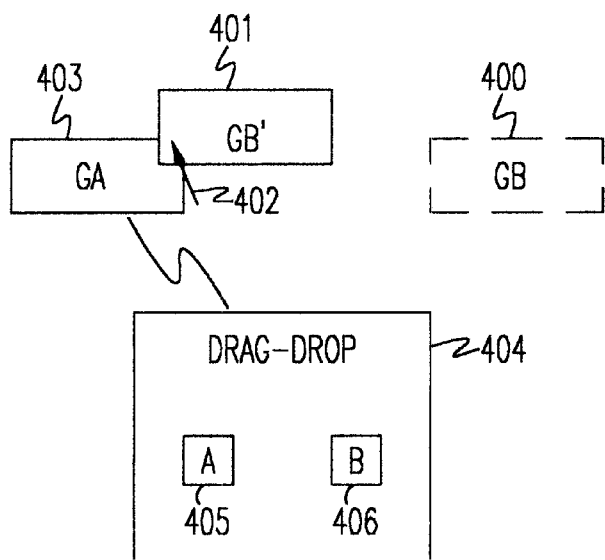
FIG. 5 depicts the dropping process of direct manipulation.

Basic operations for direct manipulation, as background reference for this invention, are initializing direct manipulation, dragging a graphical object over another, and dropping a graphical object onto another. These are illustrated in FIGS. 3, 4, and 5 respectively. These three phases are typically delimited by initializing when a mouse button is depressed, dragging while the button remains depressed and possibly moved, and dropping when the button is released. It should be noted that while direct manipulation is typically initialized with the depression of a mouse button, it is not a necessary element, provided that some action or activity delineates the three phases so mentioned. We use the typical mouse depression/release convention for descriptive purposes of this teaching. Also, it is common to augment these phases of direct manipulation by detecting key depression from a keyboard, wherein at each of the three phases so described, additional or alternative activity may be commenced or carried out during direct manipulation. Finally, as a matter of terminology, the dragging visual object or associated memory objects are designated as acting in a guest role, while drop-area visual objects or associated memory objects are designated as acting in a host role. The following explanation of direct manipulation is commonly implemented in window operating systems.

In FIG. 3, there is illustrated the initialization of a direct manipulation. Direct manipulation typically commences with a mouse button depression operation while the mouse pointer 201 is over a graphical object GB 200. The application program 202 that manages these graphical objects is then called by the data processor providing the memory object B 205 corresponding to the graphical object GB 200. At that point, the application program 202 indicates an appropriate drag image GB' 203, to use for the drag operation. After that, motion of the mouse pointer 204 will move the drag image according as long as the mouse button is depressed. Typically, the original visual object, GB 200, remains at its original position to the beginning of this operation, maintaining its original appearance.

In FIG. 4, there is illustrated the dragging phase of direct manipulation. Here it is assumed that graphical object GB 300 has been initialized for direct manipulation. Its drag image GB' 301 is also shown at a distinct location as dictated by the mouse pointer 302. Being the intermediate phase of direct manipulation, it is assumed in accordance with typical practice of direct manipulation, that the mouse button used to initialize it is currently being depressed. FIG. 4 shows that the drag image GB' 301 partially overlaps another graphical object GA, 303. This constitutes what is known as a "drag over" process. Typically, but not by necessity, "drag-over" requires not only the overlap of images as shown, but also that mouse pointer 302 be inside host image 303. This practice is assumed here, but not as a requirement to the practice of the invention.

The application program 304 that manages these graphical objects is then called by the data processor, providing the memory objects A 305 and B 306 corresponding to the graphical objects GA and GB respectively. The application program then indicates whether or not the graphical object GB 300, as indicated by its drag image GB' 301, may be "dropped" onto GA 303. Typically, if yes, the point indicator 302 remains a pointer; otherwise, a refusal indicator (not shown).

FIG. 5 illustrates the dropping phase of direct manipulation. Here it is assumed that graphical object GB 400 has been initialized for direct manipulation. Its drag image GB' 401 is also shown at a distinct location as dictated by the mouse pointer 402. Also shown is graphical object 403, with the drag image GB' overlapping it with allowance to drop from the dragging operation (i.e., the mouse indicator is a pointer). When the mouse button is release, this is an indication of making a drop of GB, as represented by the drag image GB' 401, onto graphical object GA. When this happens, the application program 404 is called by the data processor system, providing the memory objects A 405 and B 406 corresponding to the graphical object GA and GB respectively. The program then performs some activity, typically relating to the memory objects A and B.

Figure 6:
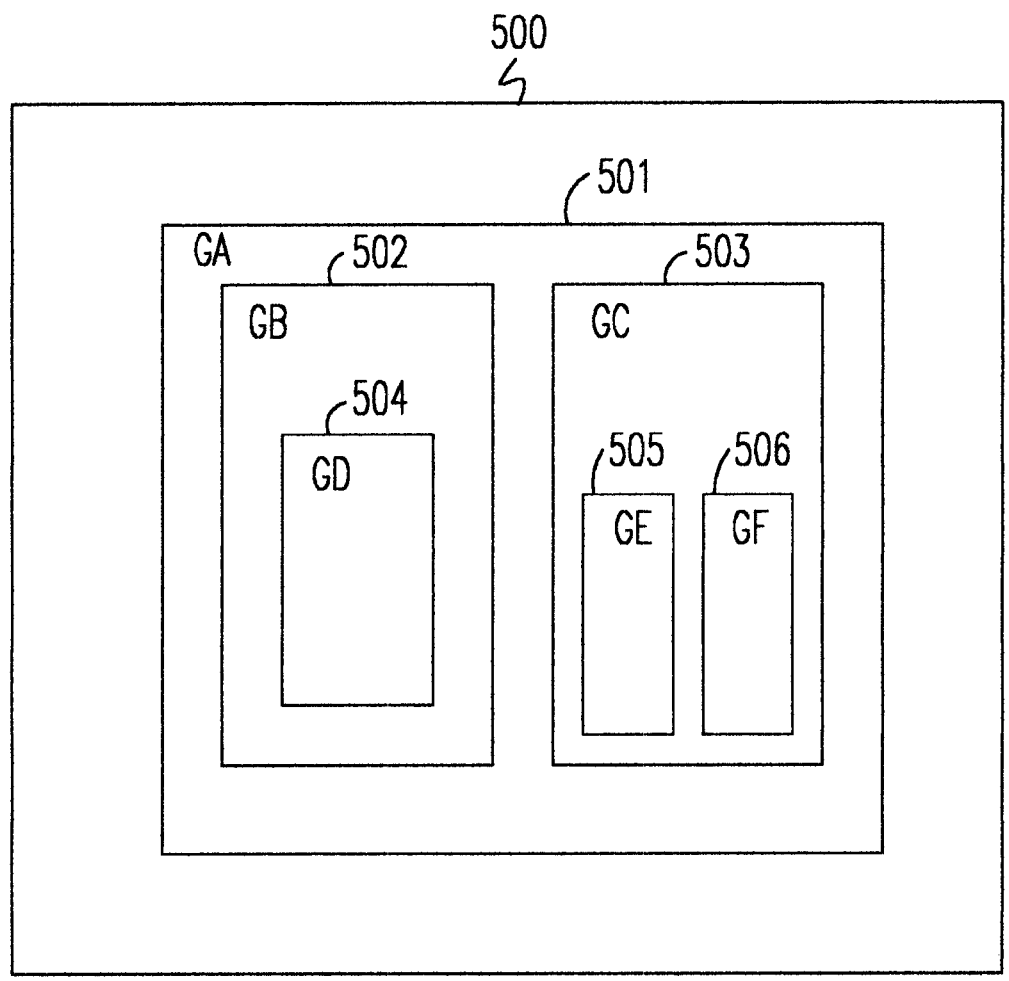
FIG. 6 depicts a hierarchically structured visual on a display screen.
Figure 7:
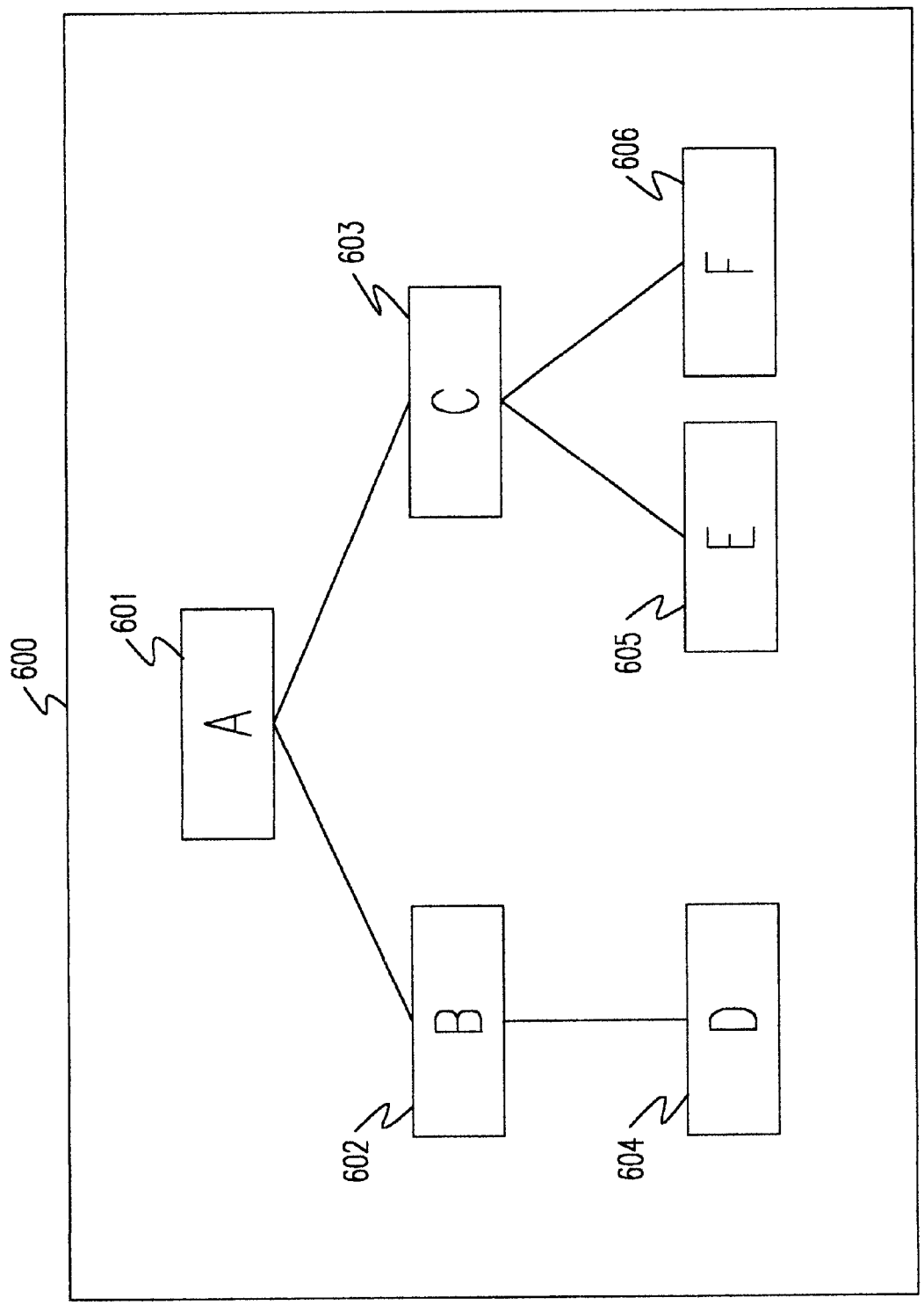
FIG. 7 depicts a memory object structure corresponding to a hierarchically structured visual.

The present invention pertains to the use of direct manipulation on hierarchically structured visuals. FIGS. 6 and 7 illustrate the composition of a visual object by nested graphical elements. FIG. 6 shows a visual object on a display screen 500. The visual object is composed a main graphical object GA 501, which contain graphical objects GB 502 and GC 503. GB contains graphical object GD 504. GC contains graphical objects GE 505 and GF 506. In many window systems, hierarchical graphical containment of this sort is achieved by nesting windows within windows. The present invention should not be construed to this limitation. Other techniques such as drawing nested images would also suffice. What is required however is that the underlying graphical system is capable of initiating direct manipulation on any nested graphical element.

FIG. 7 depicts the organization of objects in memory 600 corresponding to the graphical elements depicted in FIG. 6. Herein is shown a hierarchical structure of memory objects. The implementation of the hierarchy is of no relevance to the implementation of the present invention except that a computer program be able to traverse the tree node to node. There is shown in FIG. 7 a memory object A 601 corresponding to graphical element GA 501, which has as children memory objects B 602 and C 603, corresponding to graphical elements GB 502 and GC 503. Object B has object D 604 as a child, corresponding to GD 504. Object C has children objects E 605 and F 606, corresponding to graphical elements GE 505 and GF 506.

This present invention concerns the behavior of direct manipulation between graphical elements of visual objects. An important issue is related to the nesting of element. The nesting aspect of graphical elements in a visual object intuitively indicates that inner elements are "part of" outer elements. However, defined behavior of direct manipulation amongst graphical elements is independent of that, for instance, dragging and dropping could be allowed between graphical elements independently of the nesting of graphical elements. In many cases, it would be expedient and practical for an application to have a graphical element delegate the dragging and dropping capabilities to its parent. The statement of when that should occur is a formulation of a resolution policy on direct manipulation.

Figure 8:
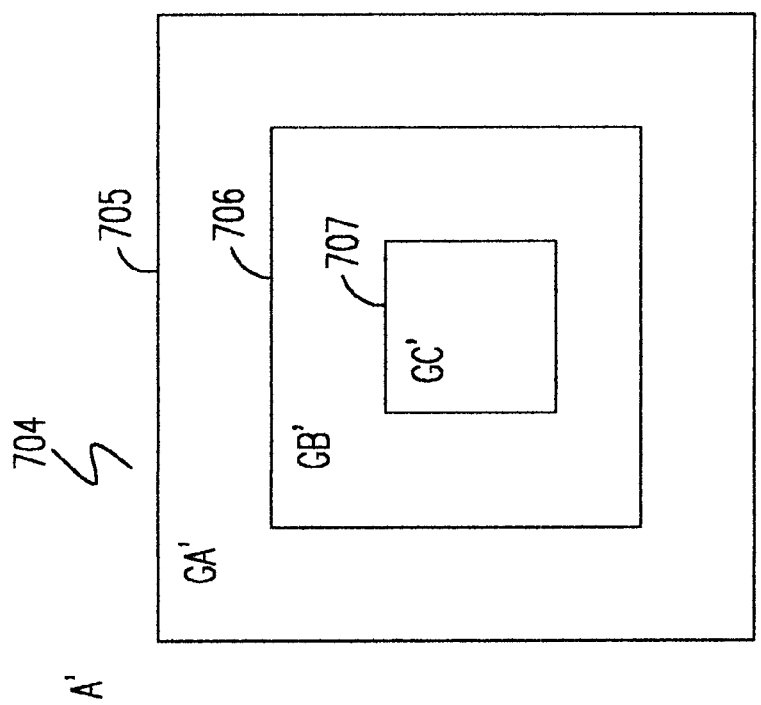
FIG. 8 depicts an example for two hierarchically structured visuals towards illustrating the use of resolution policy.
Figure 8:
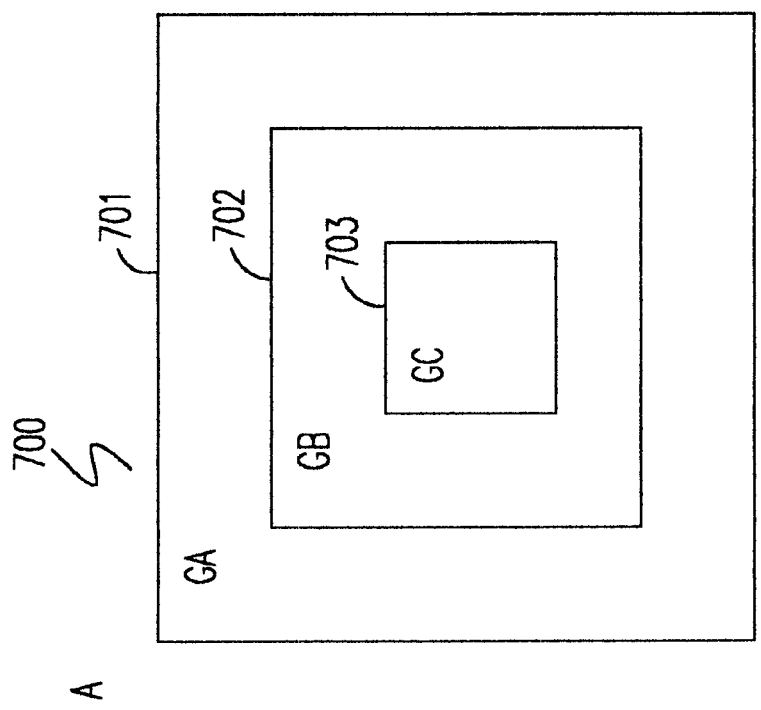

By way of illustration of the utility of a resolution policy, consider FIG. 8. Herein are two visual objects, the first visual object, A 700 of which comprises graphical elements GA 701, GB 702, and GC 703. The second visual object, A' 704 is composed of GA' 705, GB' 706, and GC' 707. Consider the following three cases where GC' is dragged over GC.

Case 1: Suppose GC' and GC have no direct manipulation interaction, but GC' and GB do. Also no parent of GC' interacts with GC. Then it is preferred for the direct manipulation behavior of GC' over GC to behave like that of GC' over GB, i.e. using the same drag image and drop logic, etc.

Case 2: Suppose GC' and GC have no direct manipulation interaction, but GB' and GC do. Then it is preferred for the direct manipulation behavior of GC' over GC to behave like that of GB' over GC.

Case 3: Suppose GC' and GC have no direct manipulation interaction, but GB' and GB do. Also GC' interacts with no parent of GC. Then it is preferred for the direct manipulation behavior of GC' over GC to behave like that of GB' over GB.

Figure 9:
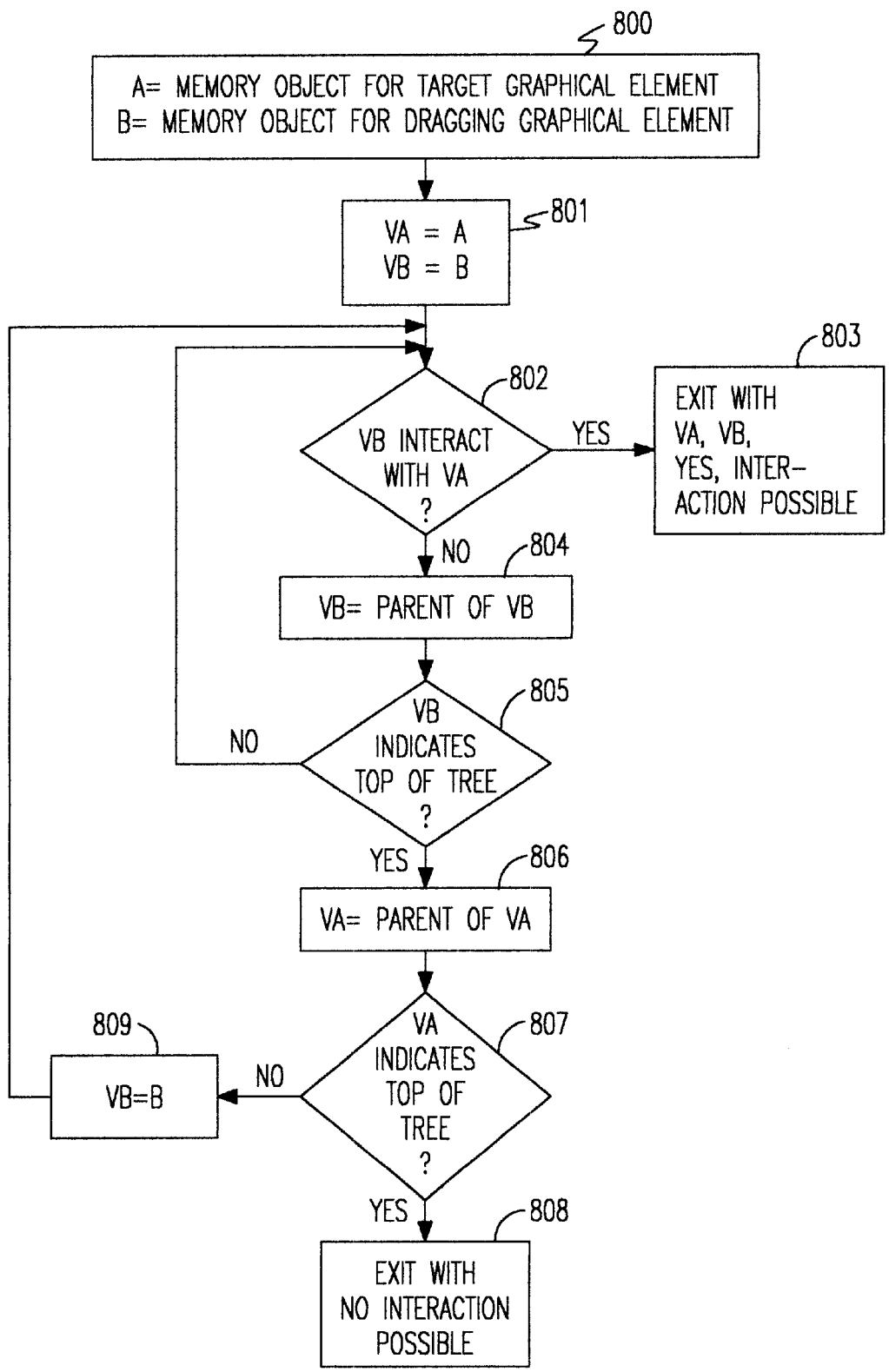
FIG. 9 depicts the logic for a resolution policy.

The resolution policy, according to the preferred embodiment of the present invention, is shown in FIG. 9. The policy can be thought of as a program with the inputs being the memory objects corresponding to the graphical element over which dragging or dropping is occurring, and the graphical element on which the direct manipulation was initiated. The idea behind this policy is that precedence is given to finding a matching graphical element from the dragging element's visual object over the drop-area element's visual object. The outputs of this program are:

An indication if dragging/dropping is allowed.

A memory object for the drop-area graphical element, which may be the object over which the initiating drag object overlaps, or some parent thereof.

A memory object for the dragging graphical element, which may be the initiating object or some parent thereof.

The input parameters are given by A and B in block 800. A is the memory object for the graphical element being dragged over, and B is the memory object for the dragging graphical element. First two "loop" variables, VA and VB, are assigned A and B respectively in block 801. A check is made to see if VB has a direct manipulation with VA in decision block 802. If so, the program returns VA and VB and an indication that dragging/dropping is allowed in block 803. Otherwise, VB is assigned the parent of itself in block 804. A check is made to see if the parent is past the root of the B's visual object tree in decision block 805. If not, the process resumes at the check for resolution in block 802. Otherwise, VA is assigned the parent of itself in block 806. A check is made to see if the parent is past the root of A's visual object tree in decision block 807. If yes, the program returns an indication that no dragging/dropping is allowed in block 808. Otherwise, VB is reset to B in block 809, and control passes back to the resolution check in block 802.

It should be noted that this algorithm is independent of whether the two visual objects are the same or not. As well, many times direct manipulation implementations are augmented with interpretations of keyboard keys. In that case, additional logic would be added as application-level adjustments which are additional but not essential to the implementation of the present invention.

Figure 10:
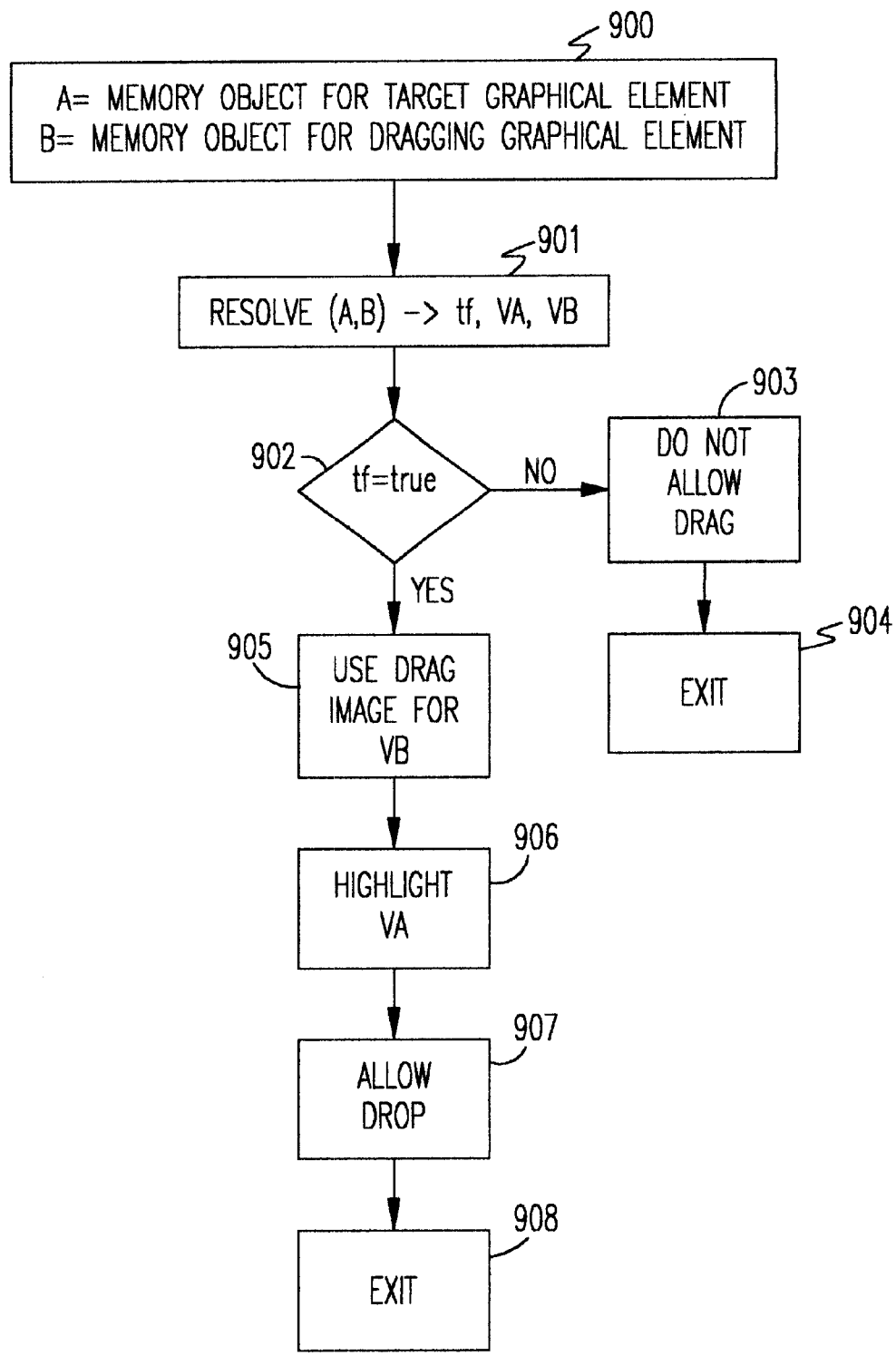
FIG. 10 depicts the use of a resolution policy during the dragging phase of direct manipulation.

FIG. 10 is a flow diagram for how the resolution policy would be invoked during the dragging-over phase of direct manipulation. In this case, the input parameters are given by A and B in block 900. A is the memory object for the graphical element being dragged over, and B is the memory object for the dragging graphical element. A call is made to the resolution policy passing A and B in block 901, and a return is made of whether or not drag-drop is allowed (tf), and the memory objects for the drop-area and dragging object that can be used (VA and VB). A test is made to see if drag-drop is allowed in block 902. If not, disallowing drag-drop is indicated to the direct manipulation system in block 903, and the program exits 904. If drag-drop is allowed, the drag image could be set to that of VB in block 905. This possible setting of the drag image is optional to the algorithm, but doing so would improve usability of direct manipulation relative to the resolution policy. Also, the drop-area given by VA could be highlighted in block 906. This is also optional to the algorithm, but doing so would improve usability of direct manipulation relative to the resolution policy. Allowing drag-drop is indicated to the direct manipulation system in block 907, and the program exits 908.

Figure 11:
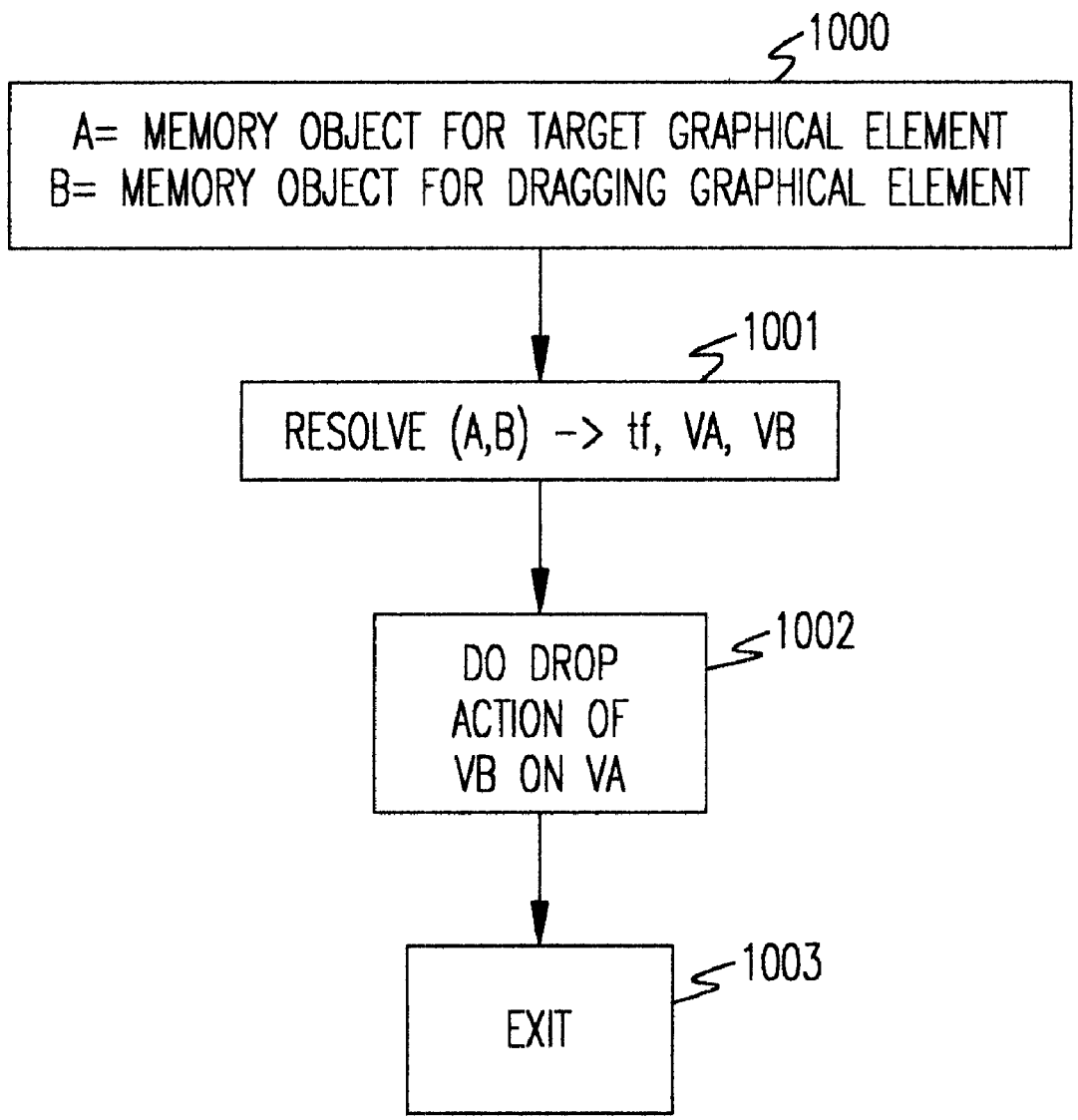
FIG. 11 depicts the use of a resolution policy during the drop phase of direct manipulation.

FIG. 11 is a flow diagram for how the resolution policy would be invoked during the drop phase of direct manipulation. In this case the input parameters are given by A and B in block 1000. A is the memory object for the graphical element being dragged over, and B is the memory object for the dragging graphical element. A call is made to the resolution policy passing A and B in block 1001, and a return is made of whether or not drag-drop is allowed (tf), and the memory objects for the drop-area and dragging object that can be used (VA and VB). Since this phase can only be called if the dragging-over phase had approved the drop, there is no need to check tf for proceeding, i.e., VA and VB should be valid. The drop action corresponding to VB being dropped on VA is then executed in block 1002. The program exits 1003.

It should be noted that this method is independent of whether the two visual objects are the same or not. As well, many times direct manipulation implementations are augmented with interpretations of keyboard keys. In that case, additional logic would be added as application-level adjustments which are additional but not essential to the teaching of this invention.

While the invention has been described in terms of a single preferred embodiment, those skilled in the art will recognize that the invention can be practiced with modification within the spirit and scope of the appended claims.

I claim:

1. A method for resolving policies for direct manipulation on hierarchically structured visuals, said method comprising the steps of:

initializing a first visual object VA in a first chain of nested visual objects represented as parent/child relationships for the first visual object and a second visual object VB in a second chain of nested visual objects represented as parent/child relationships for the second visual object, wherein the second visual object VB is manipulated with the first visual object VA;

determining for the second visual object VB, a third visual object VC in the second chain for the second visual object that has a manipulation definition with a fourth visual object VD in the first chain for the first visual object, but if there is no direct manipulation defined for any visual object VC in the chain of visual objects for the second visual object VB that corresponds to a fourth visual object VD in the chain of visual objects for the first visual object VA, then indicating that no manipulation definition exists; and returning an indication that the desired manipulation of the second visual object VB with the first visual object VA is allowed if a VC and VD were determined, otherwise returning an indication that the desired manipulation of the second visual object VB with the first visual object VA is not allowed.

2. A method as recited in claim 1, wherein the step of determining the visual object VC takes precedence over determining the visual object VD, such that each visual object in the chain of the second visual object VB is traversed for a visual object in the chain of the first visual object VA before traversing the next parent in the chain of the first visual object VA to determine the visual object VC.

3. A method as recited in claim 1, wherein the first visual object is a host object and the second visual object is a guest object.

4. A method as recited in claim 3, wherein the direct manipulation is defined as dragging a guest visual object over or onto a host visual object.

5. A method as recited in claim 1, further comprising the step of displaying a drag image of the visual object VB.

6. A method as recited in claim 1, further comprising the step of displaying a drop area with a form of highlighting.

7. A method as recited in claim 1, further comprising the step of displaying an image of the visual object VB in a place corresponding to a drop area.

8. A computer readable medium containing code for resolving policies for direct manipulation on hierarchically structured visuals, the code implementing the steps of:

initializing a first visual object VA in a first chain of nested visual objects represented as parent/child relationships for the first visual object and a second visual object VB in a second chain of nested visual objects represented as parent/child relationships for the second visual object, wherein the second visual object VB is manipulated with the first visual object VA;

determining for the second visual object VB, a third visual object VC in the second chain for the second visual object that has a manipulation definition with a fourth visual object VD in the first chain for the first visual object, but if there is no direct manipulation defined for any visual object VC in the chain of visual objects for the second visual object VB that corresponds to a fourth visual object VD in the chain of visual objects for the first visual object VA, then indicating that no manipulation definition exists; and returning an indication that the desired manipulation of the second visual object VB with the first visual object VA is allowed if a VC and VD were determined, otherwise returning an indication that the desired manipulation of the second visual object VB with the first visual object VA is not allowed.

* * * * *